United States Patent
Chheda et al.

(10) Patent No.: US 6,898,192 B2
(45) Date of Patent: May 24, 2005

(54) METHOD AND APPARATUS FOR IMPROVING FAST FORWARD LINK POWER CONTROL DURING VARIABLE RATE OPERATION OF CDMA SYSTEMS

(75) Inventors: Ashvin H. Chheda, Plano, TX (US); Yiping Wang, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 823 days.

(21) Appl. No.: 09/751,273

(22) Filed: Dec. 29, 2000

(65) Prior Publication Data

US 2002/0085502 A1 Jul. 4, 2002

(51) Int. Cl.[7] .......................... H04B 7/16; H04B 7/216; H04J 13/00
(52) U.S. Cl. .................... 370/311; 370/320; 370/342; 455/522
(58) Field of Search ................................ 370/252, 278, 370/282, 311, 316, 320, 332, 335, 342, 209, 318; 455/67.11, 127.1, 522

(56) References Cited

U.S. PATENT DOCUMENTS

| | | | | |
|---|---|---|---|---|
| 5,396,516 A | * | 3/1995 | Padovani et al. | 375/225 |
| 6,073,025 A | * | 6/2000 | Chheda et al. | 455/522 |
| 6,137,840 A | * | 10/2000 | Tiedemann et al. | 375/297 |
| 6,330,462 B1 | * | 12/2001 | Chen | 455/572 |
| 6,393,276 B1 | * | 5/2002 | Vanghi | 455/422.1 |
| 6,526,261 B1 | * | 2/2003 | Takeuchi et al. | 455/69 |
| 6,542,483 B1 | * | 4/2003 | Dinc et al. | 370/332 |
| 6,563,810 B1 | * | 5/2003 | Corazza | 370/335 |
| 6,597,723 B1 | * | 7/2003 | Zeira et al. | 375/130 |
| 6,603,752 B1 | * | 8/2003 | Saifuddin et al. | 370/335 |
| 6,690,652 B1 | * | 2/2004 | Sadri | 370/252 |
| 6,711,150 B1 | * | 3/2004 | Vanghi | 370/342 |
| 6,757,537 B1 | * | 6/2004 | Choi et al. | 455/438 |
| 6,771,700 B1 | * | 8/2004 | Razoumov et al. | 375/227 |
| 2002/0086694 A1 | * | 7/2002 | Tran | 455/522 |
| 2002/0110101 A1 | * | 8/2002 | Gopalakrishnan et al. | 370/335 |

* cited by examiner

*Primary Examiner*—Hassan Kizou
*Assistant Examiner*—Ahmed Elallam
(74) *Attorney, Agent, or Firm*—Garlick Harrison & Markison, LLP; James A. Harrison (57) ABSTRACT

The method and apparatus of the present invention includes reducing the power level by a delta value in excess of the reduction in the bit error rate and its proportionate power reduction rate in response to a data rate change. If the bit rate is reduced to eighth, then the power transmission level can be reduced to a value of $1/(8+\Delta)$ relative to FULL power. As an additional aspect of the present invention, the base station controller also generates a selectable frame error rate calculates the corresponding signal to noise ratios that will provide the commanded frame error rate. The FER may be selected according to data type or source or according to power transmission level and for data rate.

12 Claims, 7 Drawing Sheets

| CURRENT RATE | NEW RATE | | | |
|---|---|---|---|---|
| | FULL | HALF | QUARTER | EIGHTH |
| FULL | 1 | $1/(2+\Delta 1)$ | $1/(4+\Delta 2)$ | $1/(8+\Delta 3)$ |
| HALF | $(2+\Delta 1)$ | 1 | $(2+\Delta 1)/(4+\Delta 2)$ | $(2+\Delta 1)/(8+\Delta 3)$ |
| QUARTER | $(4+\Delta 2)$ | $(4+\Delta 2)/(2+\Delta 1)$ | 1 | $(4+\Delta 2)/(8+\Delta 3)$ |
| EIGHTH | $(8+\Delta 3)$ | $(8+\Delta 3)/(2+\Delta 1)$ | $(8+\Delta 3)/(4+\Delta 2)$ | 1 |

METHOD AND APPARATUS FOR IMPROVING FAST FORWARD LINK POWER CONTROL DURING VARIABLE RATE OPERATION OF CDMA SYSTEMS

BACKGROUND

1. Field of the Invention

The present invention relates generally to communication systems and particularly to power control and a code division multiple access communication system.

2. Description of Related Art

The Federal Communications Commission (FCC) governs the use of the radio frequency (RF) spectrum, deciding which industry gets certain frequencies. Since the RF spectrum is limited, only a small portion of the spectrum can be assigned to each industry. The assigned spectrum, therefore, must be used efficiently in order to allow as many frequency users as possible to have access to the spectrum.

Multiple access modulation techniques are some of the most efficient techniques for utilizing the RF spectrum. Examples of such modulation techniques include time division multiple access (TDMA), frequency division multiple access (FDMA), and code division multiple access (CDMA). CDMA modulation employs a spread spectrum technique for the transmission of information. A spread spectrum system uses a modulation technique that spreads a transmitted signal over a wide frequency band. This frequency band is typically substantially wider than the minimum bandwidth required for transmitting the signal. The spread spectrum technique is accomplished by modulating each baseband data signal to be transmitted with a unique wideband spreading code. Using this technique, a signal having the bandwidth of only a few kilohertz can be spread over a bandwidth of more than a megahertz.

A form of frequency diversity is obtained by spreading the transmitted signal over a wide frequency range. Since only 200–300 kHz of a signal is typically affected by a frequency selected fade, the remaining spectrum of the transmitted signal is unaffected. A receiver that receives the spread spectrum signal, therefore, will be affected less by the fade condition. In addition, such a system has good performance in cases where interference may occupy a narrow-band.

In a CDMA-type radiotelephone system, multiple signals are transmitted simultaneously at the same frequency. A particular receiver then determines which signal was intended for that receiver by a unique spreading code in the signal. The signals at that frequency, without the particular spreading code intended for the particular receiver, appear to be noise to that receiver and are ignored.

Because code division multiple access networks employ a system in which all transmissions occur in the same frequency band, it is well known that it is important to transmit at the lowest possible power that allows for the delivery of a communication signal at a certain level of accuracy or grade of service criteria. The reason that it is important for base stations to transmit to mobile stations with a minimal level of power and, on the reverse link, for mobile stations to transmit to base stations with minimal amount of power, is that each transmission adds to the noise level for all other receivers. In addition, if the per user power on the forward link is minimized there is more power available for other users, thereby increasing the capacity of the system. Similarly on the reverse link, if less power is used, apart from the interference benefits mentioned above, the mobile station can extend its battery life and/or range of transmission.

Many different approaches have been developed to reduce power transmission levels of the base stations and mobile stations. For example, systems have been implemented in which a mobile station initially transmits at an estimated power level that is required to successfully deliver a communications signal. Thereafter, the transmissions between the mobile station and the base station are decreased in power until the signal to noise ratio or error rates fall between acceptable levels. Then, they are increased or decreased so as to transmit at a power level that delivers communication signals either at a threshold power level or having a threshold error rate. For example, if measured signal to noise ratio falls below a certain signal to noise ratio threshold, then power transmission levels are increased a notch. On the other hand, if frame or bit error rates exceed a defined threshold, then the power transmission level is ultimately increased to reduce the frame or bit error rate by first increasing the signal to noise ratio threshold.

Allowing quality of service of the call to degrade will reduce transmission power levels, which reduces noise and interference to other users. However, this is unacceptable from a user's perspective. Allowing too good of a quality of service, or improving quality of service beyond a certain point, on the other hand, does little to improve the user's perception of quality, but greatly increases transmission power levels, which, in turn, increases noise and interference to other users, causing their required power levels to increase in response. Ultimately, system throughput capacity is degraded.

While it is important to reduce the transmission power levels without excessively degrading communications, there is an ever present need to continue to find ways to reduce noise and interference among the transceivers while maintaining a certain level of system robustness or efficiency.

SUMMARY OF THE INVENTION

The method and apparatus of the present invention jointly facilitates the transmission of a communication signal from a base station controller or from a mobile station to the other at lower power levels than what is required by known algorithms while maintaining specified frame error rates. Additionally, the invention includes a method and apparatus that allow for the base station controller to specify the frame error rate that the mobile station, until instructed otherwise, is to use for determining whether to request a power increase or decrease. Because the mobile station uses the received frame error rate to determine a corresponding signal to noise ratio, the mobile station is able to specify power control settings in a manner that further reduces power transmission levels throughout the communication network.

More specifically, the inventors herein have recognized that a type of time diversity gain is achieved whenever a transceiver's transmission rate is reduced. By way of example, if a wireless communication network goes into a mode of transmitting data to the mobile station at a reduced bit rate equal to an eighth of a full rate, then it is possible to maintain a constant frame error rate and signal to noise ratio even though the transmission power from the base station controller is reduced to an amount that is slightly less than an eight of full power. One reason for this, among others, is that the reduced bit rate, in a CDMA system, results in a bit being transmitted multiple times in an interleaved fashion. Therefore, in a wireless channel that is experiencing fading, this will account for additional interleaving gain or in another sense, additional gain from diversity. In Additive White Gaussian Noise Condition (AWGN) channel where time diversity interleaving gain is zero, reducing power by an eighth when going from full rate to an eighth rate will result the same FER for the same required Eb/No.

Accordingly, the power transmission level is typically reduced in a proportionate level with respect to the reduction of the bit rate. In the present invention, however, because of the recognized time diversity gain that is achieved when bit rates are reduced, the present method and apparatus includes reducing the power level by a delta value in excess of the reduction in the bit data rate and its proportionate power reduction rate. For example, if the bit rate is reduced to an eighth, then the power transmission level can be reduced to a value of $1/(8+\Delta)$ relative to a full power transmission level for the same frame error rate or bit error rate.

When the bit transmission rate is increased to a full rate, then the power is increased to a full rate. For example, if the bit error rate is increased by a factor of eight, then the power transmission level is increased by the amount that it was decreased namely, by a factor of $(8+\Delta)$.

As an additional aspect of the present invention, the base station controller can also generate a frame error rate that is to be transmitted by the BTS(s) to the mobile station for the different sub-rates, i.e. the full rate transmission may have a certain frame error rate, the half rate transmission another different frame error rate target, the quarter rate transmission may also have a different frame error rate transmission, as well as the eighth rate. Accordingly, the frame error rate is selectable. The mobile station receives the frame error rate that was originated by the base station controller and calculates the corresponding thresholds required to adjust the signal to noise ratios for the different sub-rates in order to achieve the associated frame error rate targets. As the rate changes from full rate to eighth rate (for instance), the network can specify a different frame error rate requirement for the eighth rate. The FER may be sent at call start up to prevent excessive messaging as frame rate changes occur rapidly during conversation. The mobile station can then use the frame error rate for different sub-rates to compute the associated up/down step to be used in setting the target Eb/No. In one typical power control algorithm, if a frame is received in error, the target Eb/No is increased by a large step. If the frame is received as a good frame the target Eb/No is reduced by a small step. The large/small steps are mathematically related to the given FER requirement. Every sixteenth of a frame the mobile measures Eb/No of channel and compares to the target to generate up/down power commands. Thus, specifying a correct FER and the associated power transmission parameters correctly to achieve the FER are important aspects of power control.

If FER requirements are different for the different subrates, the delta values must reflect this. For instance, if we specify a one percent target FER for full rate and five percent target FER for eighth rate, the delta values change as the sub-rates switches to account for the diversity gain (mentioned above) changes and in addition to having potentially different FER requirements (higher FER means lower power requirements). Thereafter, power control commands are issued to cause a signal to be received approximately at the calculated signal to noise ratio threshold. In an alternate embodiment, the mobile station bases its power control determinations using different frame error rates for either different date rates or power levels for the received communication signals.

DETAILED DESCRIPTION OF THE DRAWINGS

Figure 1:
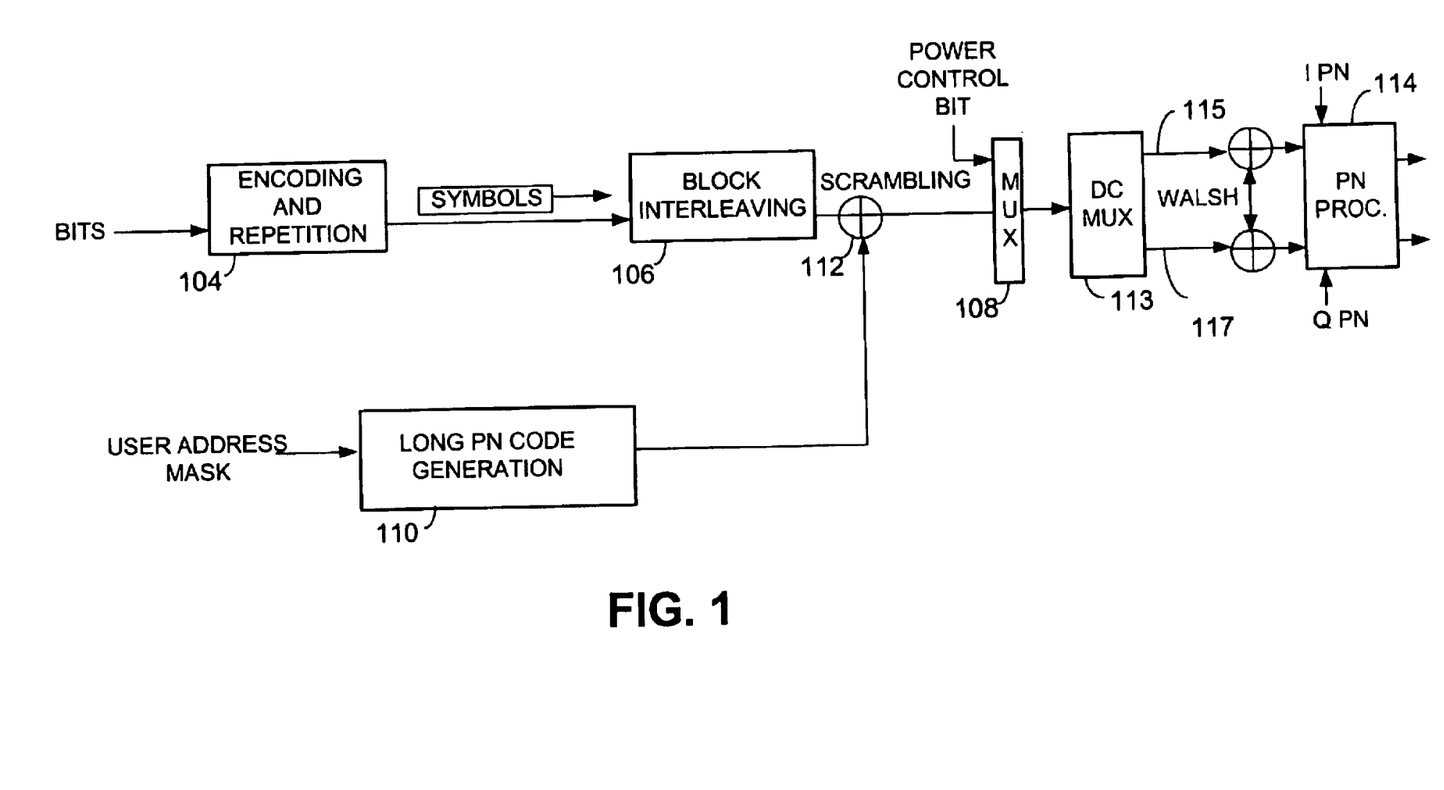
FIG. 1 illustrates a typical CDMA transmitter system for use on the forward channel from a base transceiver system (BTS) to a CDMA mobile station.

FIG. 1 illustrates a typical CDMA transmitter system for use on the forward channel from a base station transceiver system (BTS) to a CDMA mobile station. An encoder 104 creates a digital baseband signal by encoding a digitized signal representing an analog voice or digital data service. An encoder 104 accepts data bits in and produces code symbols on an output. For each clock cycle, a new data bit is shifted into a register of the encoder 104 and the data bit previously received is output. The various inputs of an encoder are added (modulo 2) to produce two or more symbols out for each clock cycle. Since the new symbols generated for each clock cycle are derived from the values of the new bit being input in all current data bits occupying the shift register during a given interval, a certain level of predictability can be realized. The output symbols of the encoder 104 are then produced to a block interlever 106. The block interlever 106 serves to create a matrix of symbols wherein each matrix represents all of the information within a defined interval. For example, in one embodiment, 384 modulation symbols may be entered into an array at a rate of 19,200 symbols per second. The array is then rearranged to create an output array to decorrelate the data and to separate adjacent symbols in time.

One advantage of this process is that the effects of bursty errors may be diminished and information eliminated by the bursty error may potentially be recovered. Moreover, in some embodiments, lower transmission rate data is repeated. Here, the lower rate repeated symbols are also separated therefore increasing the survivability of symbols to signal bit errors. In addition, for reasons beyond this application, the data array that is output by the block interleaver 106 is slightly modified in that defined power control bits are inserted in place of various data symbols.

The power control bits are used for power control purposes to optimize network effectiveness. Each symbol that is output from the multiplexer 108 is produced to a de-multiplexer 113, which passes the input bits alternately to an in-phase branch 115 and a quadrature branch 117. Each symbol that is output from the de-multiplexer 113 is exclusively ORed with an assigned Walsh function. The Walsh function is what, in a CDMA context, creates the channels of communication. Stated simply, each symbol is added across a defined bit sequence.

Continuing to refer to FIG. 1, a long PN code generator 110 generates long pseudo random number (PN) sequences to generate user-specific sequences of symbols. The Walsh code spread symbols from the combiner 112 are then spread in quadrature. The symbols are input to two exclusive OR combiners to generate a pair of short PN sequences. The first combiner exclusively ORs the Walsh code spread symbols on the in-phase branch 115 with the end phase sequence while the second combiner exclusively ORs the Walsh code spread symbols on the branch 117 with the quadrature phase (I) and (Q) sequences. The I and Q sequences are then produced to a PN processor 114 that, in turn, produces the final In Phase and Quadrature chip sequences for transmission.

The resulting I and Q channel code spread sequences are used to bi-phase modulate a quadrature pair of sinusoids by driving the power level of the pair of sinusoids. The sinusoidal output signals are then processed for transmission by an antenna.

Figure 2:
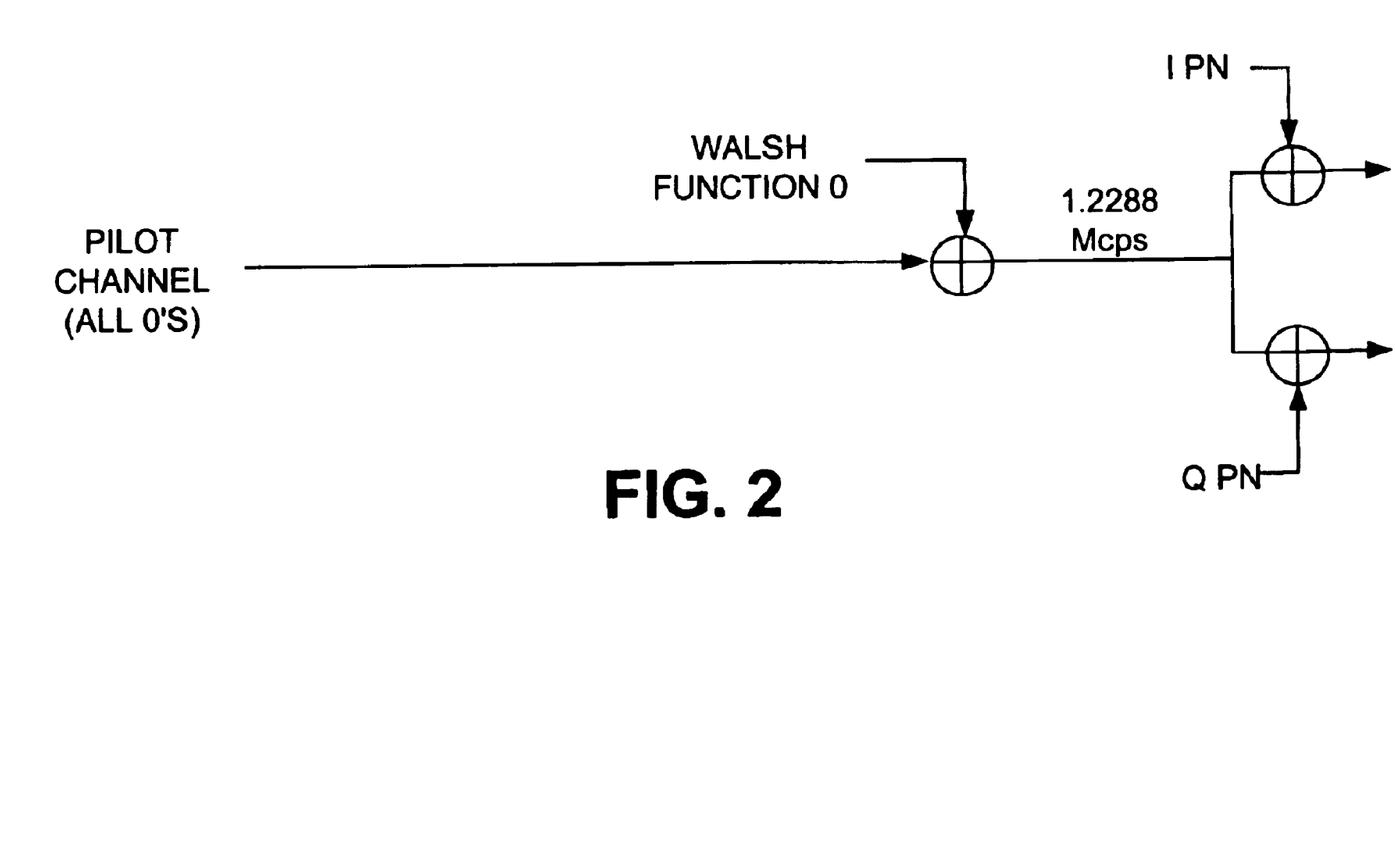
FIG. 2 is a functional block diagram illustrating the operation of a pilot channel.

FIG. 2 is a functional block diagram illustrating the operation of a pilot channel. The pilot channel is a reference channel that mobile stations use for acquisition, timing, and as a phase reference for coherent demodulation. The pilot channel signal is transmitted at all times by each base station on each active CDMA frequency. Each mobile station continuously tracks the pilot signal. Unlike long code sequences, pilot channel sequences are repeated many times every few seconds. For example, in one known system, the pilot sequence is repeated 75 times every two seconds. Not only does this aid a mobile station in its initial acquisition when it powers up, but also ensures rapid detection of cells or base station transceiver systems that form good handoff candidates.

All base stations share the same PN sequence for the pilot channel. However, each base station transmits the pilot channel at a unique phase offset value. Thus, the timing of the pilot channel provides tracking of a timing reference for a given base station and phase reference. The phase separation provides for extremely high reuse within one CDMA channel frequency. The uncoded nature of the pilot signal facilitates acquisition by the mobile stations in addition to the short duration of the pilot PN sequence.

In one described embodiment, the pilot channel is sent unmodulated, and is orthogonally spread with a Walsh function zero to ensure that it is easily recognized. Quadrature spreading and channel filtering occur exactly as discussed for all forward channel traffic.

There are a number of different forms of power control in CDMA. These are reverse link open loop power control, reverse link closed loop power control and forward link closed loop power control. This invention deals specifically with forward link closed loop power control and is described herein. The forward link closed loop power control is made up of two modes, the inner loop mode and the outer loop mode. These forms of power control are similar to their reverse link counterparts. In the forward inner loop power control, the mobile station, transmits power control commands at 800 times a second to the BTS(s) to either increase or decrease forward link power. These power control decisions are transmitted in a time-division fashion along with the reverse link pilot channel. In general, three-fourths of a power control group (1.25 ms) is used for pilot symbols, while a fourth of the power control group is used for the power control decision, otherwise known as the power control sub-channel. The BTS(s) on demodulating this decision will increase or decrease their power by a notch accordingly. The mobile station estimates the forward link signal to noise ratio from the punctured reverse link power control bits always sent at full rate on forward link frames and compares the estimate to a set-point threshold maintained by the mobile station to generate the up/down commands. Forward outer loop power control is similar to the reverse link counter-part. The mobile station demodulates the forward link frame and determines if the frame is of sufficient quality to be considered a good frame. Depending on the determination, the target signal to noise ratio maintained at the mobile station will be adjusted accordingly.

Figure 3:
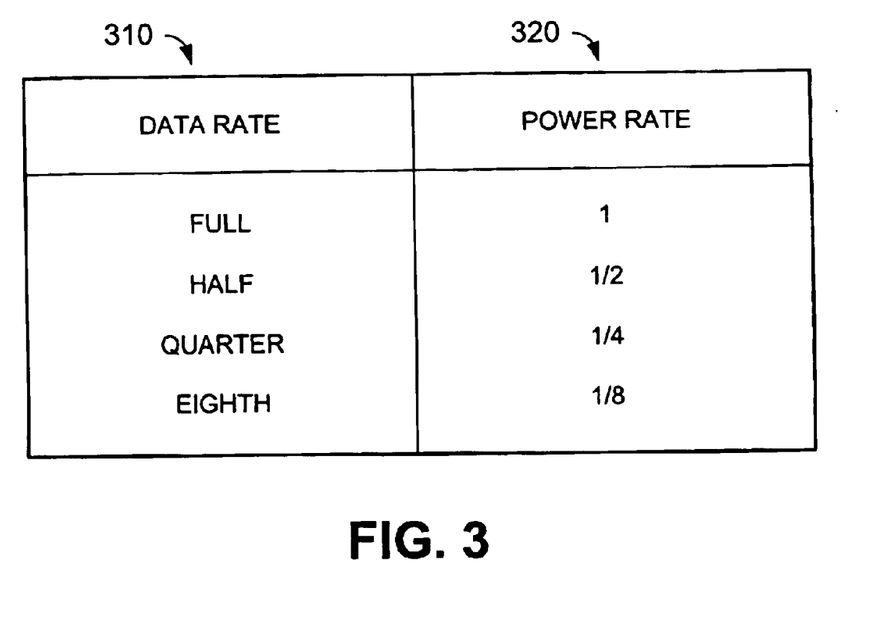
FIG. 3 is a table illustrating the relationship between data rate and power transmission levels in a code division multiple access system.

FIG. 3 is a table illustrating the relationship between data rate and power transmission levels in a prior art code division multiple access system. As may be seen by referring to the table of FIG. 3, the column shown generally at 310 reflects the relative transmission rates. The column shown generally at 320 illustrates the relative power rates with respect to the transmission rates. As a result of the basic nature of digital communications in which a reduced transmission rate results in multiple transmissions of a bit of data in a non-interleaved manner, it is possible to reduce power rates proportionately to the transmission rate.

Accordingly, as may be seen from examining columns 310 and 320, a FULL transmission rate equates to a FULL relative power rate. If the transmission rate is cut to HALF, meaning that each of the bits are transmitted twice as many times, then the relative power rate may also be cut to HALF. Similarly, QUARTER transmission rates equate to QUARTER relative power rates and EIGHTH transmission rates equate to EIGHTH relative power rates. In one version of a current CDMA system, a full rate is equal to 9600 bps, a half rate is equal to 4800 bps, a quarter rate is 2400 bps, and an eight rate is 1200 bps as is defined in Physical Layer Standard for CDMA-2000 Spread Spectrum Systems (IS-2000.2)

Generally, in CDMA systems, a BTS or mobile station will operate either at FULL or at EIGHTH transmission data rates. The EIGHTH data transmission rates are typically utilized during lulls in a conversation. Because a great percentage, and perhaps even more than half, of every conversation includes lulls in the conversation, reducing the transmission data rate and corresponding relative power rate during the lulls reduces interference to other systems. Thus, the table of FIG. 3 illustrates the two primary data rate and transmission power levels of FULL and EIGHTH and the transitionary levels of HALF and QUARTER.

Figure 4:
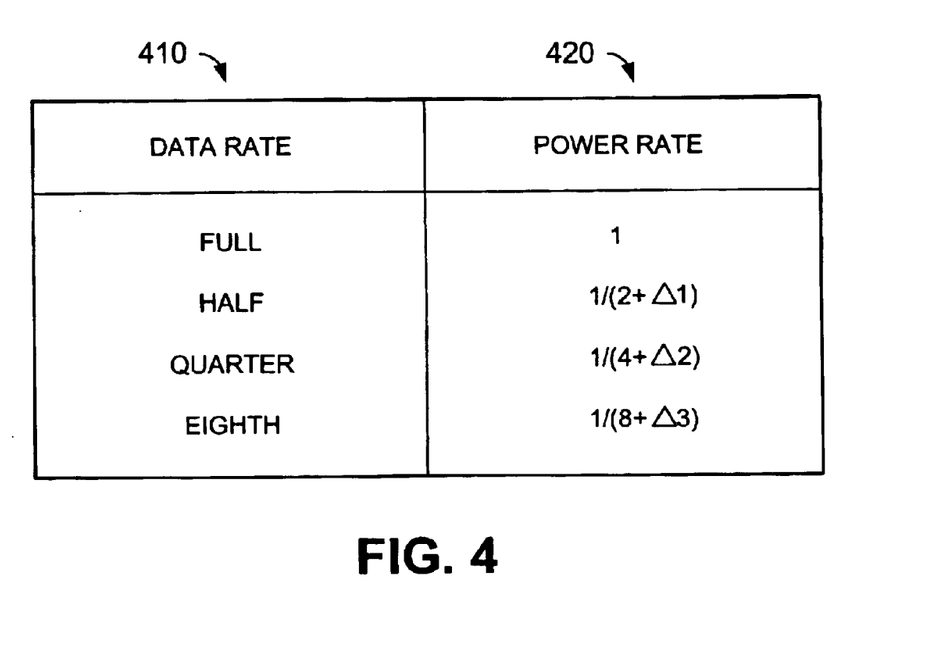
FIG. 4 is a table illustrating the relationship between data transmission rates and relative power rates in a CDMA communication network according to one aspect of the present invention.

FIG. 4 is a table illustrating the relationship between data transmission rates and relative power rates in a CDMA communication network according to one aspect of the present invention. As may be seen in column 410, the same four data transmission rates of column 310 of FIG. 3 are illustrated, namely FULL, HALF, QUARTER, and EIGHTH. In column 420, however, it may be seen that the relative power rate is reduced by a factor that is even greater than the data transmission rate as one proceeds from FULL to EIGHTH data transmission rates. More specifically, for a FULL data transmission rate, the relative power rate is also FULL. For a HALF data transmission rate, however, the relative power rate is reduced by a factor of "2" plus a delta value "$\Delta 1$". Thus, the new relative transmission power level shown in column 420 is $1/(2+\Delta 1)$. Similarly, the new and relative power rates with respect to the QUARTER and EIGHTH data rates are $1/(4+\Delta 2)$ and $1/(8+\Delta 3)$, respectively.

The inventors herein have observed that the basic nature of CDMA in which interleaved and repeated bits are recombined results in a type of time diversity gain. Therefore, to maintain a set frame error rate or signal to noise ratio, the power may be reduced more than by a factor of two as one transitions from FULL to HALF data transmission rates. Similarly, for reduction to QUARTER and EIGHTH transmission rates, a different delta value is placed in the denominator of the equation for the relative power rate.

The values for $\Delta 1$, $\Delta 2$, and $\Delta 3$ generally depend on specific system characteristics and cannot be predicted for all networks. FIG. 4 thus illustrates that if a data transmission rate is reduced by a factor of N, then the relatively relative power rate may be reduced by a factor of "N+$\Delta$". It is understood, of course, that when data rates are increased, that the relative power rate is increased by the same amount that it was previously reduced. Thus, if the power or the data transmission rate is increased by a factor of N, then the relative power rate will be increased by a factor of "N+$\Delta$".

While the above discussion of the delta values assumes static values that are stored in memory, it is noteworthy that the invention also includes a variety of methods for placing the delta values into memory for the above referenced calculations. By way of example, heuristic algorithms may be used to take an original set of delta values and to improve or modify those delta values according to system performance. As heuristic methods are known, they will not be explained here in a detailed manner. Alternatively, the delta values may be user definable even in a real time basis while the communication network is in operation. Thus, for this embodiment, operator entry of the delta values results in their being stored in a specified memory location by an algorithm selected by the user. Alternative, upon selection of a specified algorithm by the user, the current delta values being used in the power control algorithms are reset to the new values entered by the user.

In addition to employing heuristic algorithms or even enabling the operator or user to specify the delta values, there are other approaches that dynamically adjust delta values according to system conditions. For example, if a new signal is defined, e.g., a power measurement report message, in which the mobile station transmits frame error rates (or some other indicia of actual transmission performance) to the base station, the base station can adjust the delta values to "fine tune" the frame error rates to the desired value in relation to the data rate/power transmission level. For example, if a target FER is 5% but the actual FER is 4%, the delta values may be modified by the base station after being advised of the same by the mobile station to cause the power to be further reduced so as to have a FER that approaches the target rate of 5%.

Alternatively, the base station can set or adjust delta values according to present network interference conditions. For example, by measuring signal to noise for the reverse link, the base station is able to characterize existing interfering and, more generally, network conditions. Responsive to the determined characteristics, the delta values may be selected from a lookup table or may be calculated according to a formula. Further, the actual number of multipaths may be determined from the reverse link measurements. Because a system can determine the number of multipaths at the mobile station based upon the number of multipaths received at the base station, a set of delta (scaling) parameters may be selected that are a function of the number of multipaths.

Figure 5:
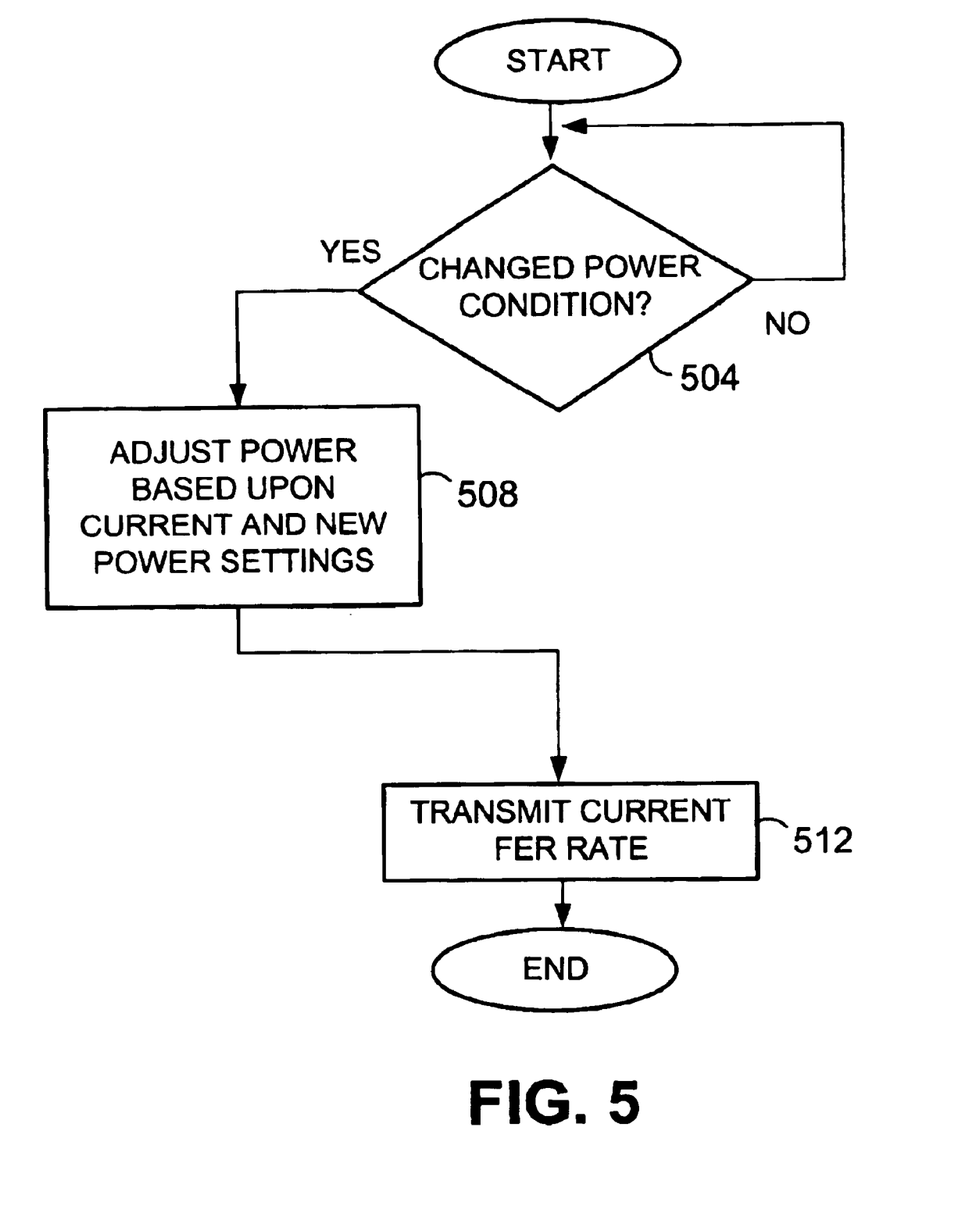
FIG. 5 is a flow chart illustrating a method for power control according to one aspect of the present invention.

FIG. 5 is a flow chart illustrating a method for power control according to one aspect of the present invention. The method of FIG. 5 is, in the described embodiment of the invention, implemented in the base station (BTS or BSC or both). It also, as indicated herein, may also be implemented within the mobile station. The first step of the inventive method illustrated in FIG. 5 is to determine whether a transition is occurring or has just occurred requiring a change in power transmission level (step 504). If not, the determination of step 504 is repeated periodically until an answer of yes is obtained. Once the answer is yes, the power transmission level is changed by an appropriate factor (step 508). The new power transmission level is characterized by an adjustment to the current power level as described herein in the description of FIG. 6.

In the described embodiment of the invention, the frame error rate is modifiable according to the type of signals being transmitted in the communication signals. For example, eighth rate signals may be allowed to have a frame error rate that is higher than full rate signals. During a lull in the conversation, for example, when the data rate is an eighth, it may be acceptable in some communication networks to have a significantly higher frame error rate since voice data is not being transmitted at the moment. Additionally, the stepping from one power level to another according to data rate changes may also be modified in a given system. For example, the power rates changes from full to approximately fourth as the data rate changes directly from full to fourth. Alternatively, for example, if the data rate may change from half to eighth, so to will the power transmission level (in addition to the change introduced by the delta value).

As an optional step, therefore, a corresponding frame error rate is transmitted from the BTS to the mobile station, which frame error rate was specified to the BTS by the base station controller (step 512) in one embodiment of the present invention.

Figure 6:
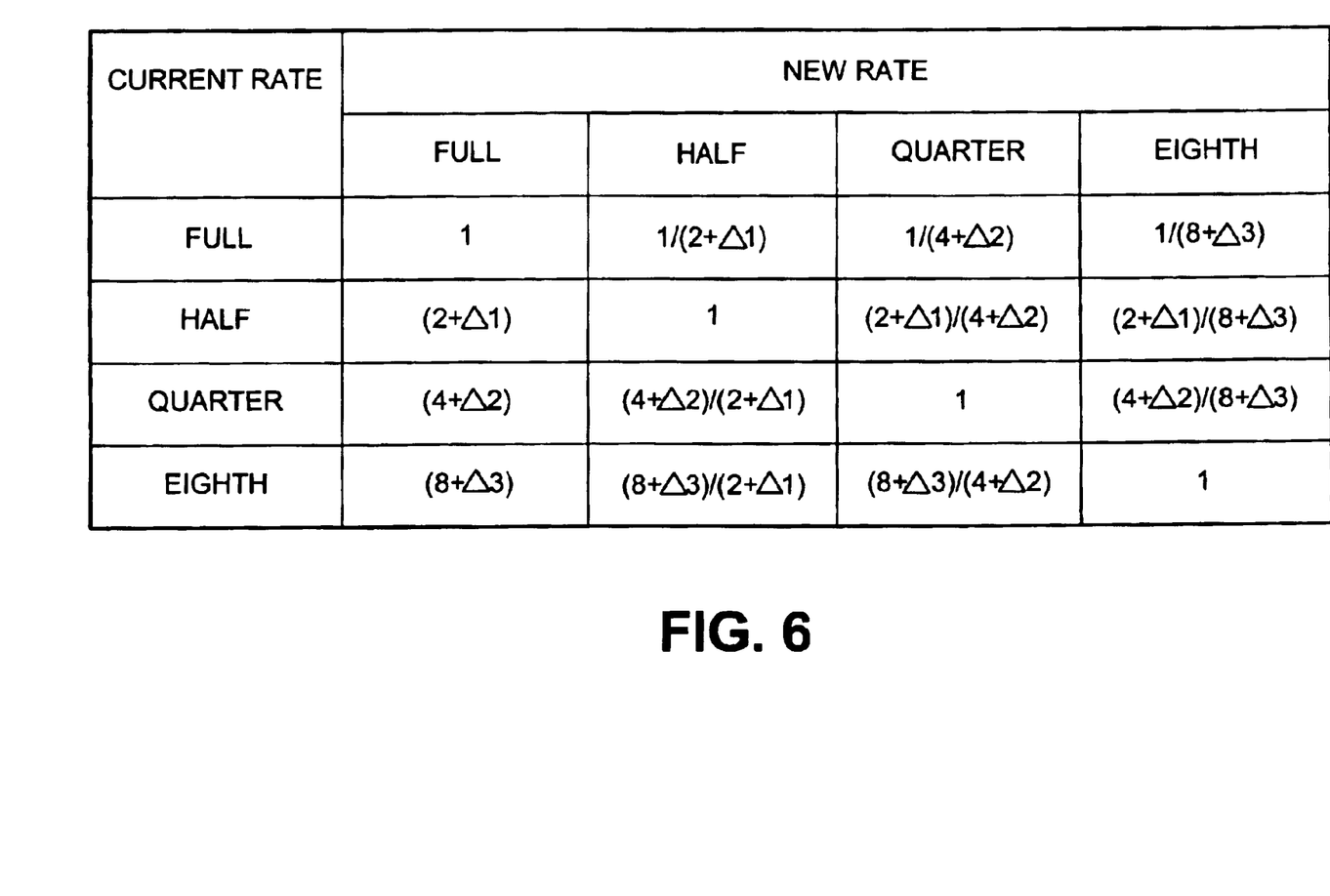
FIG. 6 is a table showing the forward gain change factors during a rate change relative to a starting power transmission level according to one embodiment of the present invention.

FIG. 6 is a table showing the forward gain change factors during a rate change relative to a starting power transmission level according to one embodiment of the present invention. More specifically, referring to the table of FIG. 6, the table illustrates the relative size of the increase or decrease according to the starting position. For example, if the system is transmitting at the QUARTER data rate and at a power level, relative to FULL that is characterized by $1/(4+\Delta 2)$ and the data rate is being increased to a HALF data rate, then the power transmission level is increased by a factor of $(4+\Delta 2)/(2+\Delta 1)$.

The inventors herein have also determined that the actual delta values change according to network conditions, and more specifically, the current state or mode of the mobile station. A mobile station that is in a hand-off state or mode of operation will have a different set of delta values relative to a mobile station that is not in a hand-off state. To illustrate, if a mobile station experiencing Rayleigh fading conditions, the delta values may approximately be set equal to 1.5, 3.5, and 9.4 for $\Delta 1$, $\Delta 2$, and $\Delta 3$ respectively. In hand off cases, however, the delta values might be approximately set to 0.5, 1.4, and 3.5 for $\Delta 1$, $\Delta 2$, and $\Delta 3$, respectively.

Figure 7:
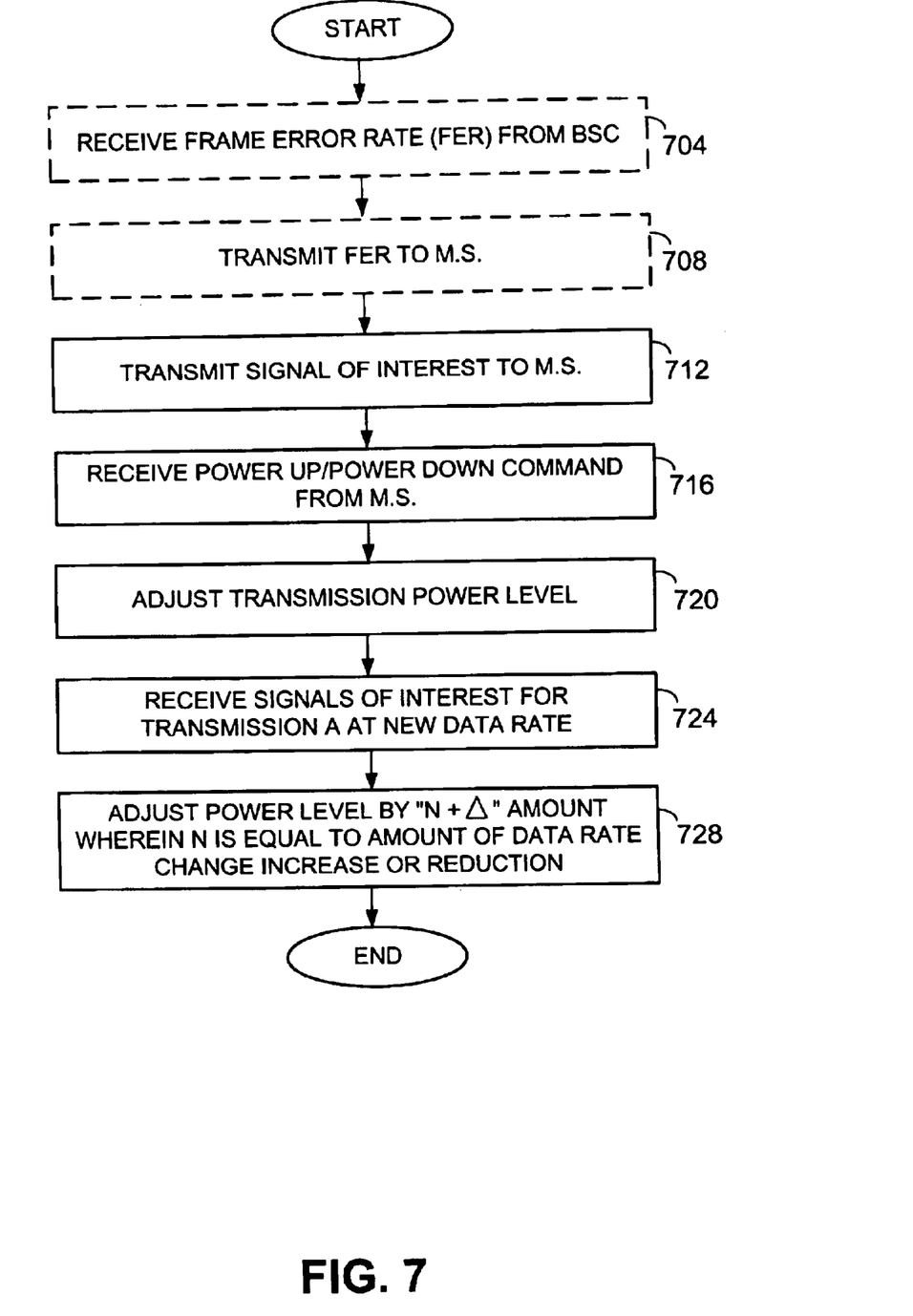
FIG. 7 is a flow chart illustrating a method for power control within a code division multiple access network according to one embodiment of the present invention.

FIG. 7 is a flow chart illustrating a method for power control within a code division multiple access network according to one embodiment of the present invention. Referring now to FIG. 7, a base station transceiver system initially receives a frame error rate from a base station controller that is to be transmitted to a mobile station (step 704). As indicated before, the base station controller generates frame error rates based upon specified network conditions, or upon operator selection. For purposes of the present embodiment of the invention, (step 704) is optional.

If a frame error rate is received from the base station controller, then the base station transceiver system transmits it to the mobile station (step 708). Thereafter, the base station transceiver system transmits the communication signal to the mobile station (step 712). Transmitting the frame error rates to the mobile station enables it to be changed according to the data rate (and type of data). After transmitting the communication signal to the mobile station, the base station transceiver system receives either a power up or power down commands from the mobile station according to the calculated frame error rate within the mobile station (step 716). Accordingly, the base station transceiver system adjusts the transmission power level either up or down a defined amount (step 720).

Thereafter, the base station transceiver system receives a communication signal for transmission to the mobile station at a new data rate (step 724). Accordingly, the base station transceiver system adjusts the power level by a factor of N+Δ wherein an N is equal to the amount of data rate change increase or reduction (step 728). For example, if the data rate is being changed from an EIGHTH to FULL, then the power level is transmitted at a new level that is (N+Δ) greater than the present level. Conversely, if the base station transceiver system is transmitting at a FULL power level and is to start transmitting data at an EIGHTH data rate, then the power level is reduced by a factor of (N+Δ).

Figure 8:
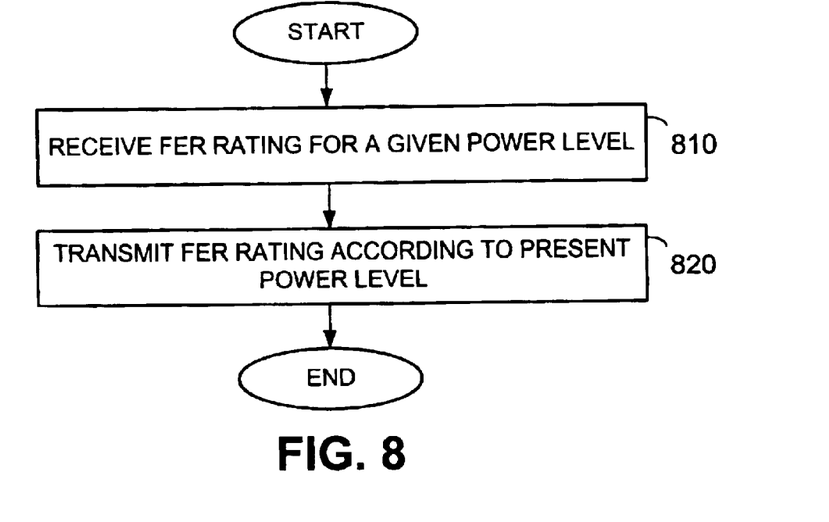
FIG. 8 is a flow chart illustrating operation of a code division multiple access network in which the frame error rate may be varied.

FIG. 8 is a flow chart illustrating operation of a code division multiple access networks in which the frame error rate may be varied. Referring now to FIG. 8, the first step of the inventive process includes determining a frame error rate rating for a power level (step 810). Thus, the frame error rate may be adjusted far more dynamically according to the data transmission rate and corresponding power transmission level. For example, the frame error rate may be set equal to one percent when the system is transmitting at a full data rate with FULL power levels and to five percent when the system is transmitting at an EIGHTH power transmission rate and a power rate of 1/(8+Δ3). Alternatively, the frame error rate may be generated according to signal type. For example, if the communication signal carries data, then in one embodiment of the invention, the frame error rate is set equal to five percent. On the other hand, if the communication signal type carries voice, then the frame error rate is set equal to one percent.

After the FER rating or frame error rate rating was determined, it is transmitted to the mobile station (step 820). Accordingly, the mobile station may make its power up and power down determinations according to the newly received frame error rate.

Figure 9:
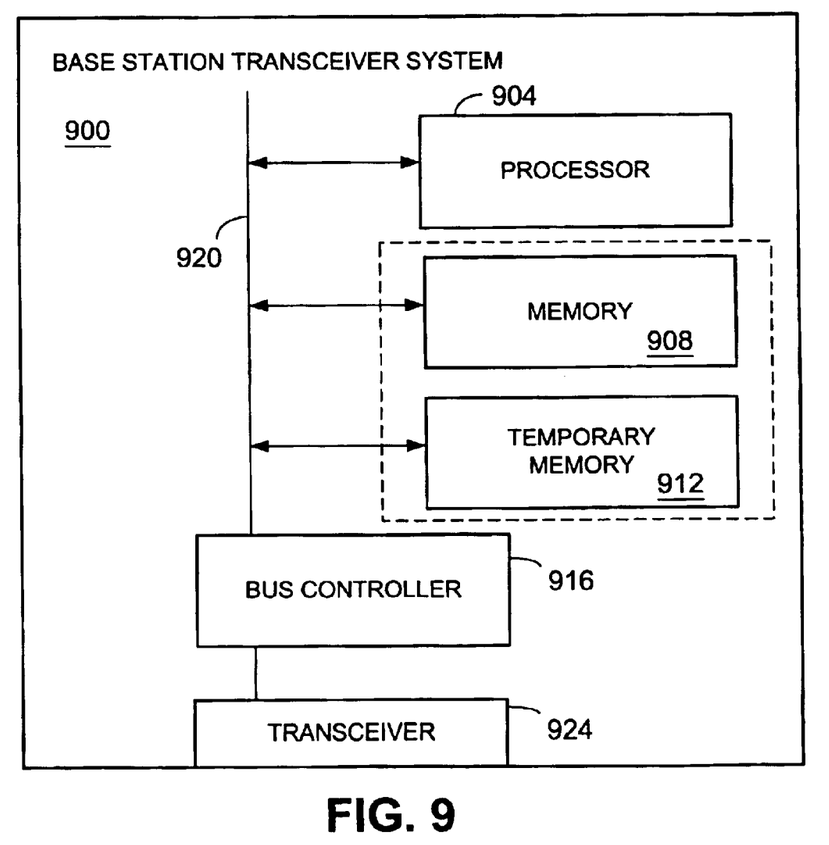
FIG. 9 is a functional block diagram of a base station controller according to one embodiment of the present invention.

FIG. 9 is a functional block diagram of a base station transceiver system according to one embodiment of the present invention. BTS 1100 includes a processor 904 that is coupled to communicate with a memory 908, a temporary memory 912, and a bus controller 916 over an internal bus 920. Bus controller 1116 is coupled to a transceiver 924 for transmitting and receiving communication signals and other communication signals to and from at least one external device. In operation, processor 904 communicates with memory 908 to receive computer instructions that define the operation of the BTS. In particular, memory 908 includes computer instructions that cause BTS 900 to determine the frame error rate that is to be utilized by a mobile station in generating power up and power down commands as described herein. Additionally, in one embodiment of the invention, memory 908 further includes computer instructions that define the initial power transmission level for the BTS 900 to utilize whenever the communication signals are first transmitted at a new data rate. Thereafter, the transmission power level is adjusted by the BTS 900 according to power up and power down commands generated by the mobile station. Processor 904 further communicates with temporary memory 912 to store data therein while executing the computer instructions stored within memory 908.

The computer instructions within memory 908 define operational logic as described herein with respect to the transmission power levels and the transmission of the frame error rate ratings. While FIG. 9 describes a BTS, it may also describe in an alternate embodiment of the invention in which the described logic is defined within the circuitry of a Base Station Controller.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims. As may be seen, the described embodiments may be modified in many different ways without departing from the scope or teachings of the invention.

What is claimed is:

1. A wireless transceiver system, comprising:

a processor;

a memory for storing computer instructions that define operational logic of the wireless transceiver system, wherein the logic causes the transceiver system to increase or decrease transmission power levels by a factor that is characterized by the equation of N+Δ according to whether a data transmission rate is increased or decreased by a factor of N and wherein the logic defines the value of Δ so that it varies according to at least one of detected system conditions and system data transmission rates; and an internal bus coupled to the processor and the memory wherein the processor receives the computer instructions from the memory over the bus to execute the computer instructions.

2. The wireless transceiver of claim 1 wherein the Δ value varies according to the amount of change in the data transmission rate.

3. The wireless transceiver of claim 2 wherein a first Δ value relates to an additional amount of power reduction when the amount of change in the data transmission rate is reduced to HALF relative to FULL data transmission rates.

4. The wireless transceiver of claim 2 wherein a second Δ value relates to an additional amount of power reduction when the amount of change in the data transmission rate is reduced to QUARTER relative to FULL data transmission rates.

5. The wireless transceiver of claim 1 wherein the delta values vary according to network conditions.

6. The wireless transceiver of claim 1 comprising a base station controller.

7. The wireless transceiver of claim 1 comprising a base station transceiver system.

8. The wireless transceiver of claim 1 wherein the computer instructions define logic for heuristically varying the values of Δ.

9. The wireless transceiver of claim 1 wherein the computer instructions define logic for varying the values of Δ according to measured Eb/No values on the reverse link.

10. The wireless transceiver of claim 1 wherein the computer instructions define logic for varying the values of Δ according to the frame error rate being realized by the mobile station wherein the mobile station transmits a calculated frame error rate to the base station.

11. A method for determining whether to transmit power up or power down commands, comprising:

transmitting power up and power down commands according to whether a calculated frame error rate for a received communication signal is higher or lower than a target frame error rate; and using one of at least two target frame error rates according to a data rate of the received communication signals wherein a first of the at least two target frame error rates is approximately equal to one percent.

12. The method of claim 11, wherein a second of the at least two target frame error rates is approximately equal to five percent.

* * * * *